March 14, 1961   R. B. WILLIAMS, JR., ET AL   2,974,863
ELECTRONIC TARE SUBTRACTING COUNTER
Filed Oct. 31, 1957   6 Sheets-Sheet 1
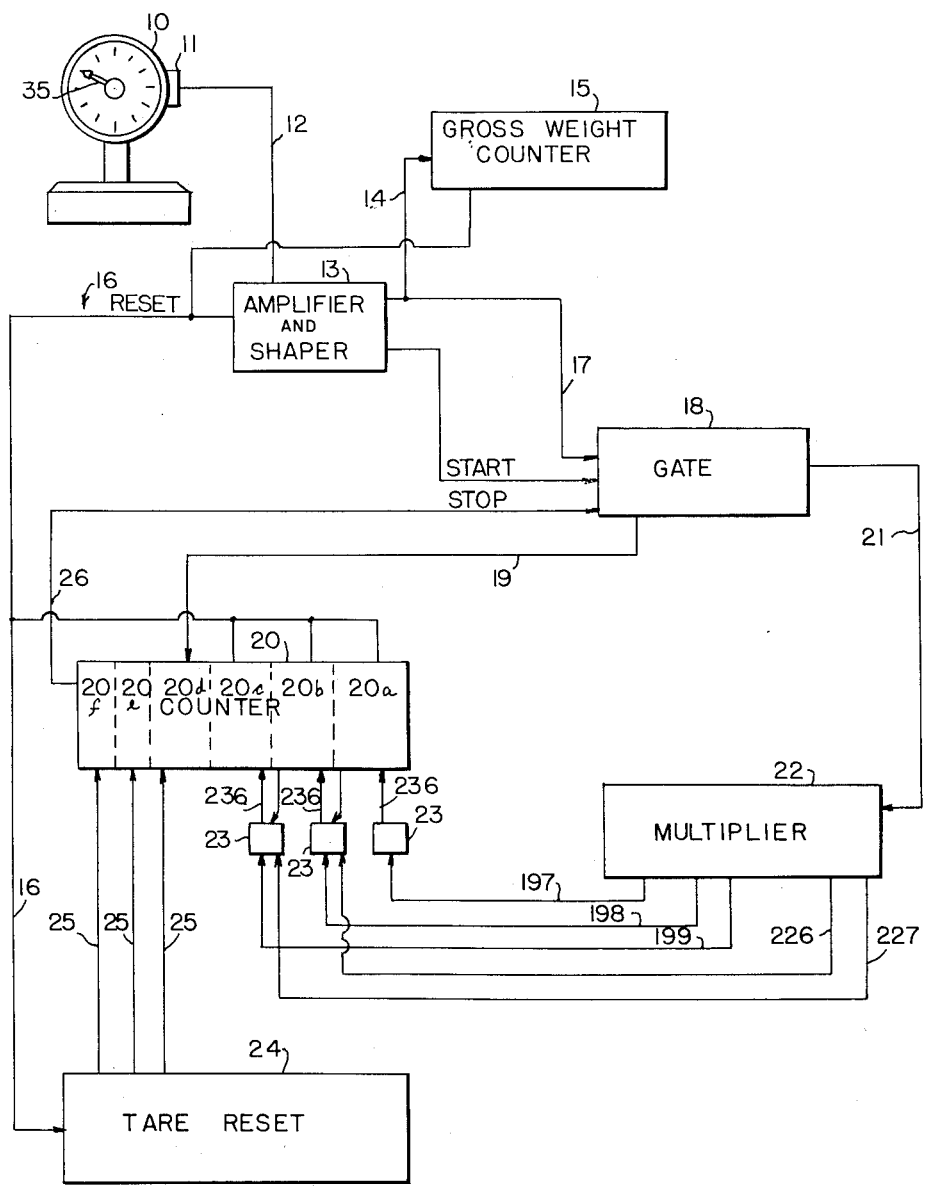
Fig. I
INVENTORS.
ROGER B. WILLIAMS JR.
ROBERT E. BELL
BY
Marshall, Marshall & Yeasting
ATTORNEYS March 14, 1961 R. B. WILLIAMS, JR., ET AL 2,974,863
ELECTRONIC TARE SUBTRACTING COUNTER
Filed Oct. 31, 1957 6 Sheets-Sheet 2
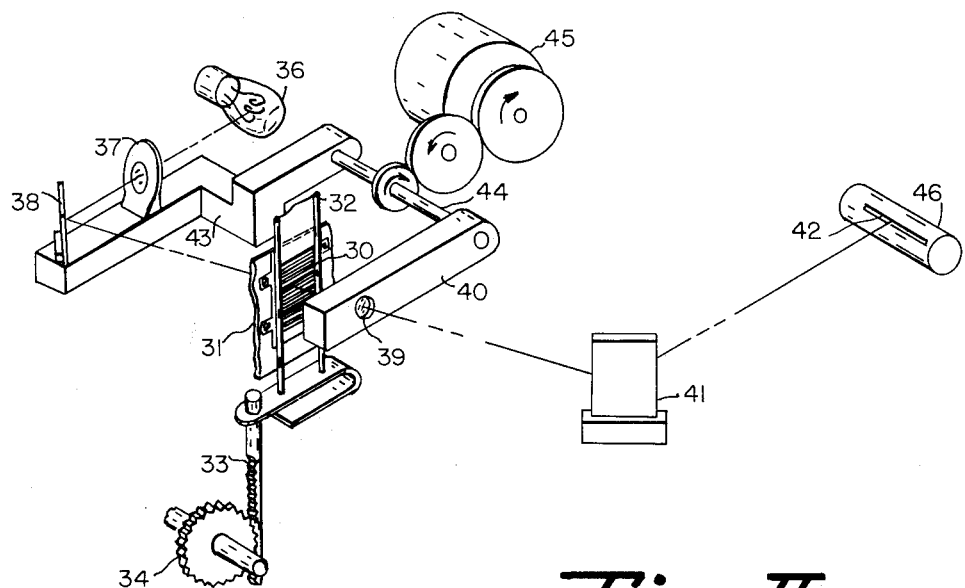
Fig. II
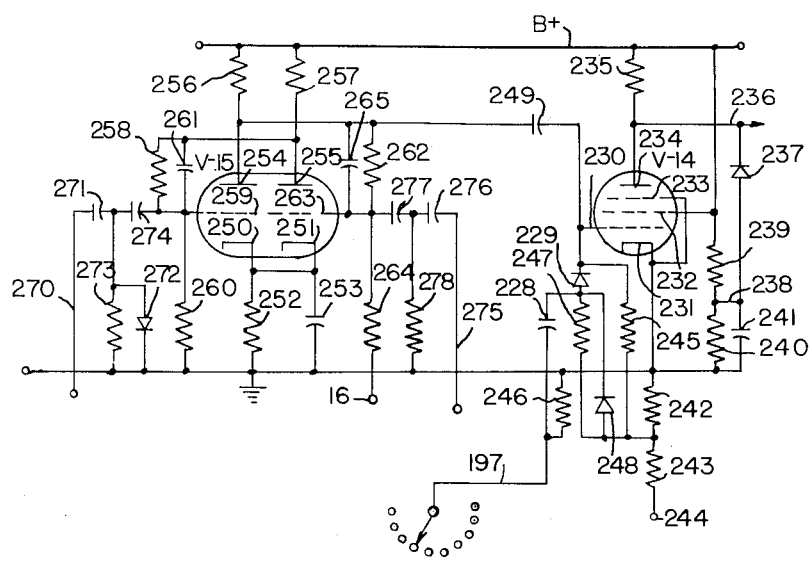
Fig. VII
INVENTORS.
ROGER B. WILLIAMS JR.
ROBERT E. BELL
BY
Marshall, Marshall & Yeasting
ATTORNEYS

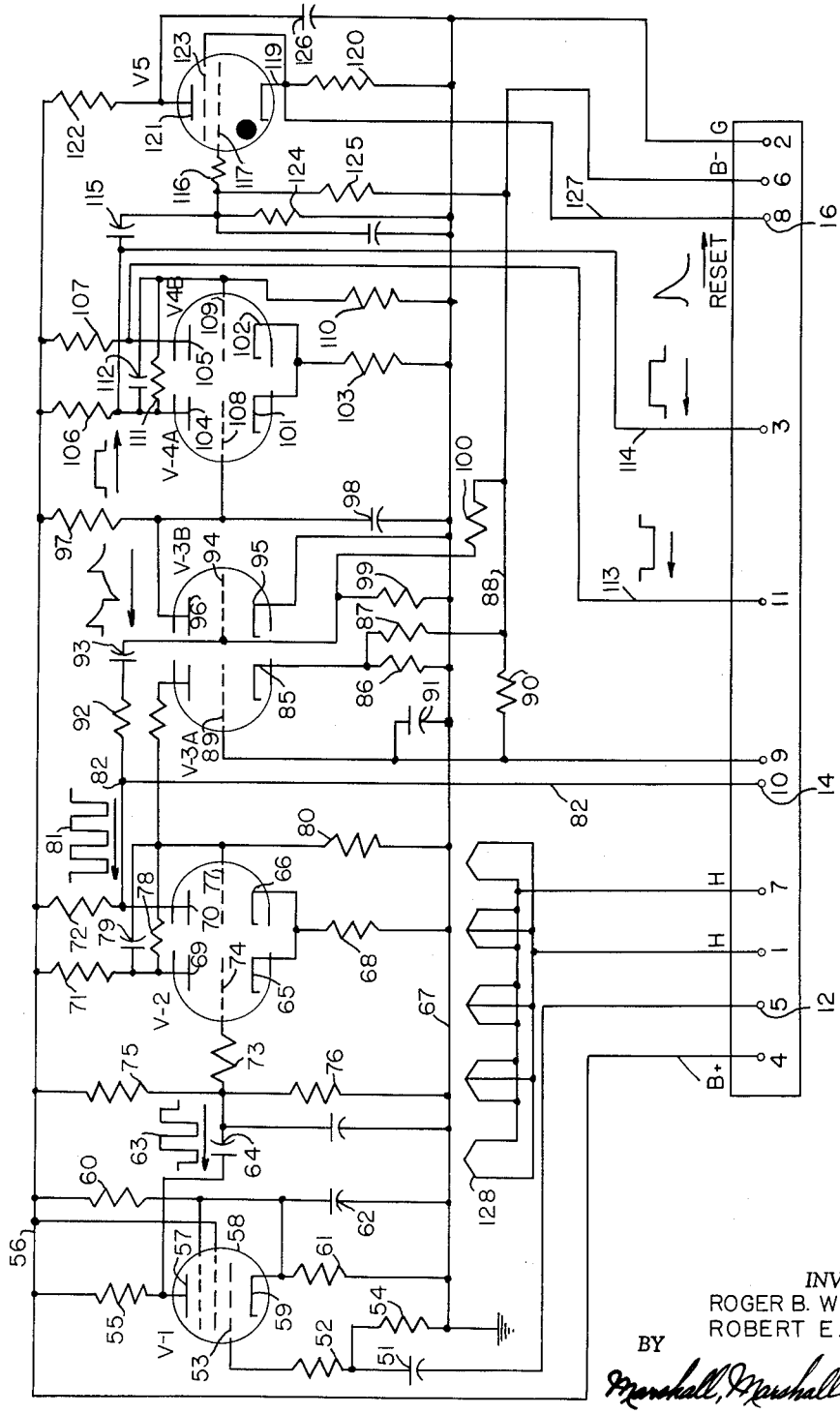
March 14, 1961   R. B. WILLIAMS, JR., ET AL   2,974,863
ELECTRONIC TARE SUBTRACTING COUNTER
Filed Oct. 31, 1957   6 Sheets-Sheet 3
Fig. III
INVENTORS.
ROGER B. WILLIAMS JR.
ROBERT E. BELL
BY
Marshall, Marshall & Yeasting
ATTORNEYS

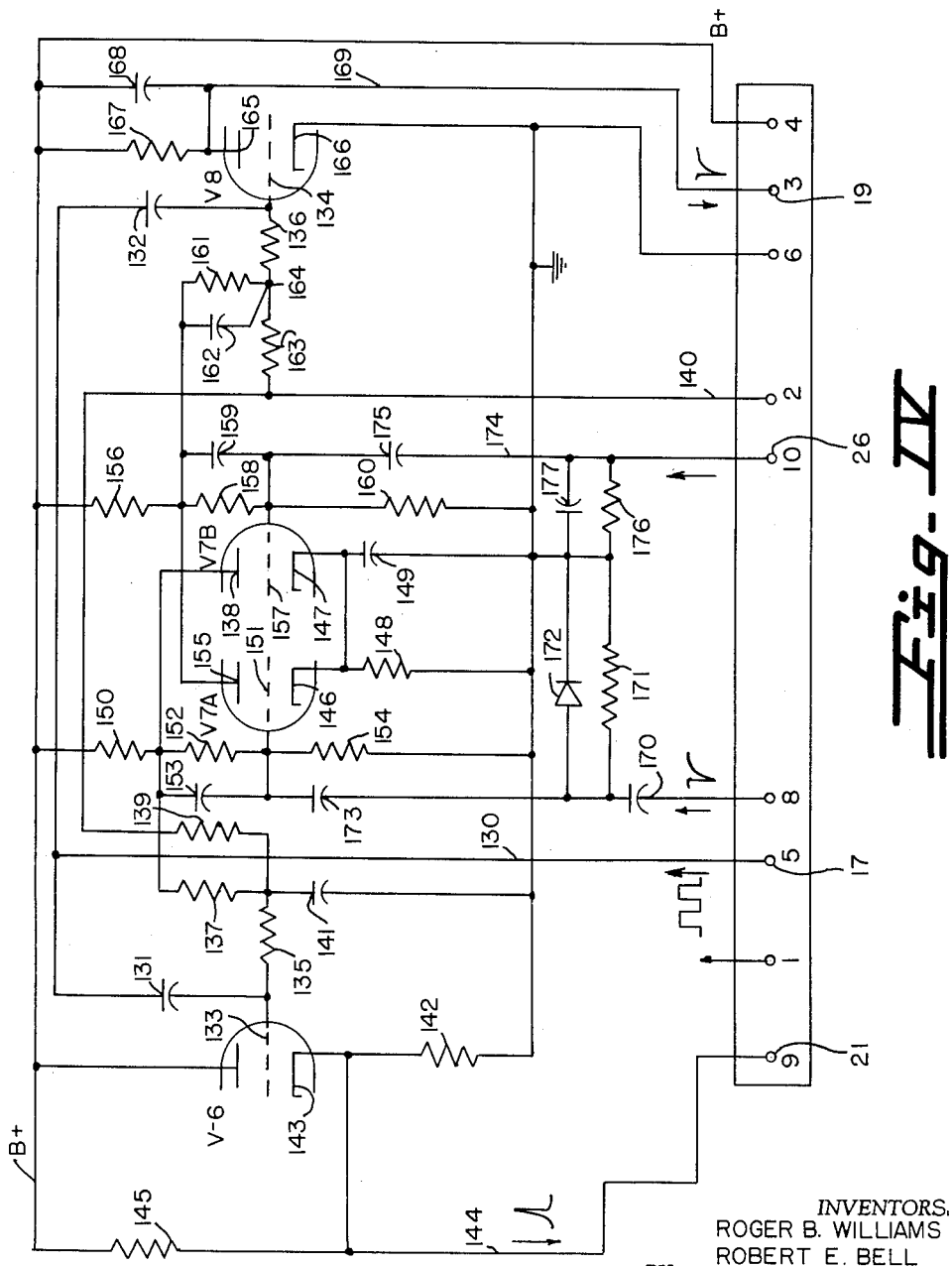

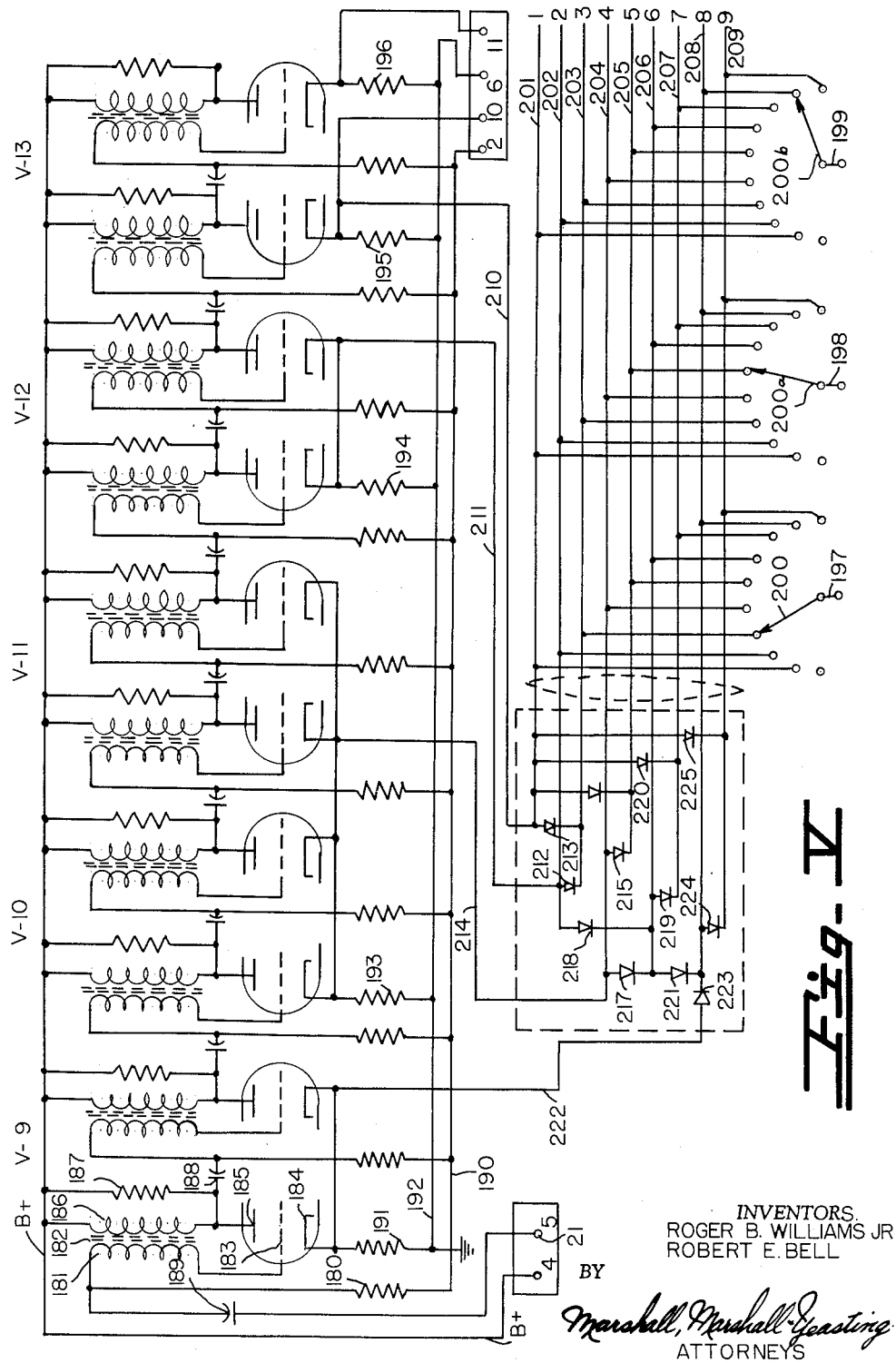

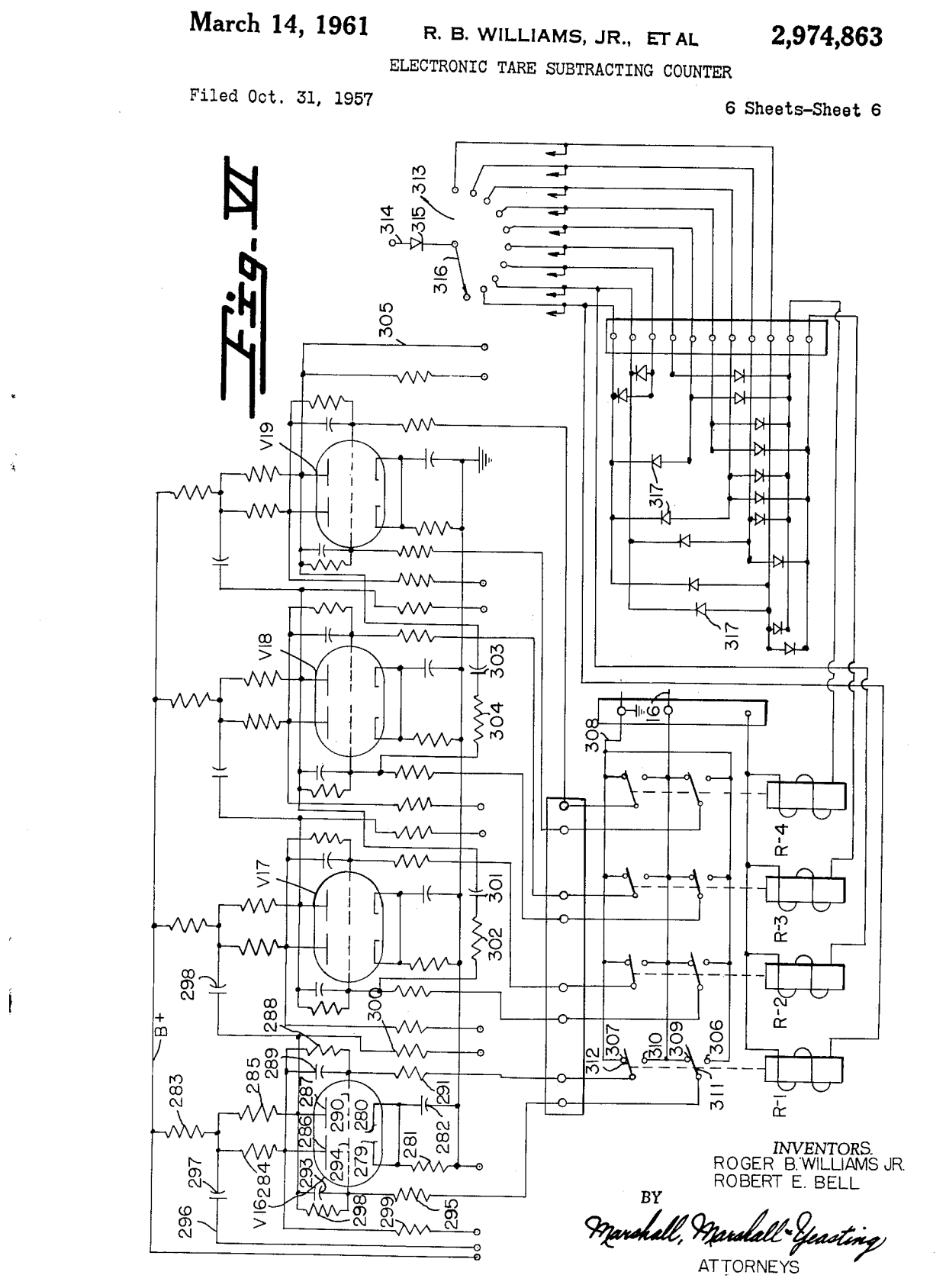

Fig. VI

United States Patent Office 2,974,863
Patented Mar. 14, 1961

2,974,863
ELECTRONIC TARE SUBTRACTING COUNTER

Roger B. Williams, Jr., and Robert E. Bell, Toledo, Ohio, assignors, by mesne assignments, to Toledo Scale Corporation, Toledo, Ohio, a corporation of Ohio Filed Oct. 31, 1957, Ser. No. 693,580

6 Claims. (Cl. 235—151)

This invention relates to electronic computing equipment for use with weighing scales and in particular to means for subtracting or eliminating a tare weight indication from a gross load indication on a scale before modifying a net weight indication according to an arbitrary factor.

The increase in use of weighing scales as part of industrial control processes in many cases requires that the indication of the weighing scale be modified according to a characteristic of the product being weighed so as to indicate or control the process according to the corrected weight of the material. In such instances it is also desirable to be able to automatically subtract the tare weight of a container or other tare load on the scale before modifying the net weight indication according to the arbitrary factor. Such operating characteristics are desirable, for example, in a retail computing scale for subtracting the tare weight of a container on the scale before multiplying the net weight indication to obtain a direct indication of the value of the commodity being weighed, and in packaging of material of known moisture content where it is desirable to indicate or print the dry weight of the article after correction for the moisture content. In the counting of small parts on a scale where the parts per unit of weight are known it is necessary to first subtract the tare weight of any container on the scale, and then multiply the resulting net weight by the number of parts per pound to get a direct indication of the number of parts in the load. A still further example is in the batching of concrete or similar materials in which one of the ingredients may vary in weight according to moisture content or some other characteristic and it is desirable to modify the quantity of another material used according to the moisture content or other variable characteristic.

A principal object of the invention is to provide an indicating and computing equipment for a weighing scale that accepts factors representing the tare weight to be subtracted and the arbitrary factor by which the net weight is to be modified and computes and indicates the corrected net weight.

Another object of the invention is to provide an organization of a presettable counter, a gating circuit, and a multiplier pulse generator that accepts a continuous series of pulses representing the sum of a known and an unknown quantity, counts the pulses that correspond to the known quantity, and that multiplies the remaining pulses by a selected factor and counts the resultant pulses to indicate the product of the unknown quantity and the selected factor.

Another object of the invention is to provide a computing system for a weighing scale which may indicate directly the product of the net weight of a commodity on the scale times an arbitrary factor.

A still further object of the invention is to provide an electronic computing system for a weighing scale which is capable of first subtracting a tare weight indication from the load indication of a scale and multiplying the resulting net weight by a correction factor to give a corrected net weight indication.

More specific objects and advantages are apparent from the following description of a preferred form of the invention.

According to the invention a weighing scale is equipped with means for generating a series of electrical pulses equal in number to the load on the scale which pulses, after amplification, are routed to a gross weight counter which counts and indicates the total number of pulses and also to a second counter which first serves to count the number of pulses to make up a preset indication of the tare weight and then serves to count the number of pulses from a multiplier to indicate the corrected net weight. Switching circuits for routing the pulses from the amplifier directly to the second counter or through the multiplier to the counter are controlled by the counter itself upon accumulating its preset count.

A preferred form of the invention is illustrated in the accompanying drawings.

In the drawings:

Figure I is a block diagram illustrating the general relationship of the various circuit assemblies making up the various components of the system.

Figure II is a diagrammatic representation of the pulse generating means that is mounted at the scale and which is capable of generating a series of electrical impulses proportional in number to the weight on the scale.

Figure III is a schematic wiring diagram of the circuits included in the amplifier and pulse shaping circuits which include the circuit means for detecting the start and end of each series of pulses from the pulse generating means.

Figure IV is a circuit diagram of the gating circuit which serves to switch the signals from the amplifier either directly to a portion of the net weight counter serving as the tare weight counter or through a multiplier to the corrected net weight counter.

Figure V is a schematic wiring diagram of the multiplier circuit which serves to correct the net weight indication according to an arbitrary factor.

Figure VI is a schematic wiring diagram of one decade of an electronic counter as used in the counters including the means for presetting the counter according to the tare weight to be considered by the circuit.

Figure VII is a schematic wiring diagram of the carry storage circuits that are used for transmitting carry pulses from one decade of the counter to the other during the multiplying operation and for delaying the transmission of such pulses to avoid interference with other pulses being fed into the counter.

These specific figures and the accompanying description are intended merely to illustrate the invention and not to impose limitations on its scope.

In the preferred form of the electronic computing circuits for use with a weighing scale as illustrated in Figure I a weighing scale 10 is equipped with a photoelectric scanning mechanism 11 (see Figure II) that transmits electrical pulses over a lead 12 to an amplifier and pulse shaping circuit 13 which physically may be located at a recording or controlling station remote from the scale. If the length of the lead 12 is more than a few feet long it is desirable to include an amplifier in the photoelectric scanning mechanism 11 to match the impedance of the photocell to the lead 12. The amplifier and shaper circuits 13 are arranged to deliver output pulses through a lead 14 to a gross weight counter 15 which counts all of the pulses and thus serves to indicate the total number of pulses which is proportional to and indicative of the gross weight of the load on the weighing scale 10. The gross weight is the sum of the known tare weight and an unknown net weight to be measured and indicated. The amplifier and shaper circuits 13 in addition to transmitting pulses to the gross weight counter 15 also sense the start and end of each scan or series of pulses and energize a counter reset lead 16 to reset the counter and other circuits to an initial starting condition at the start of each series of pulses. Output pulses from the amplifier 13 are also transmitted through a second lead 17 to a gating circuit 18 shown in detail in Figure IV, and from the gating circuit either through the lead 19 directly to a portion of a tare and net weight counter 20 or through lead 21 to a multiplier circuit 22 and thence through carry storage and amplifier circuits 23 to the net weight counter 20.

A tare reset control 24 is also provided which, as it receives a reset signal over the lead 16, transmits signals through leads 25 to various decades of the tare and net weight counter 20 to preset this counter to the nines complement of the tare weight indication to be subtracted. The reset signal also sets the gate 18 to transmit the signals directly through the lead 19 to the decades forming the tare weight portion of the counter 20.

When a sufficient number of pulses from the scanner 11 are transmitted through the amplifier 13 and gate 18 to the counter 20 by way of lead 19 so that the sum of these pulses and the complement of the tare weight already preset into the counter fills the counter, i.e. all available decades indicate zero, a signal corresponding to a carry signal from the highest decade is transmitted through a lead 26 to switch the gate circuit 18 so that the remaining pulses of the series of pulses from the scale are transmitted through the lead 21 and multiplier 22. The multiplier 22, which is set for the arbitrary factor by which the net weight is to be modified, transmits its pulses through the amplifiers and carry stages 23 into the counter 20 so that the counter then counts and indicates the modified net weight.

*Figure II*

The photoelectric scanner 11 is illustrated schematically in Figure II and comprises an optical system for counting the number of lines 30 on a fixed optical transparent chart 31 that are exposed by a mask 32 which is moved vertically by a rack 33. The rack 33 is attached to a weighing mechanism and cooperates, if desired, with a pinion 34 on an indicator shaft adapted to rotate an indicator 35 to give a visual direct indication of the load on the scale. The optical system for counting the lines 30 includes a light source 36, a condensing lens 37, a first mirror 38, a projection lens 39 carried on arm 40, a second or stationary mirror 41, and a photoelectric cell 42. The condensing lens 37 and first mirror 38 are carried on an arm 43 extending radially from a shaft 44 which through gearing or belts is driven by a motor 45 so as to rotate counterclockwise as seen in the figure. The arms 40 and 43 are maintained in parallel alignment since they are both connected to the same shaft 44. The system is arranged so that the optical path from the mirror 38 through the chart 31 and projection lens 39 converges toward the axis of the shaft 44 and would intersect that axis except for the mirror 41. The photocell 42 is positioned a distance from the mirror 41 equal to the distance from the mirror 41 to the intersection of extensions of the optical path and the shaft axis. The projection lens 39 is adjusted so that it focuses images of the chart lines 30 on a slit 46 on the face of the photocell 42. As the arms 40 and 43 are rotated by the motor 45 the optical path extending along the optical axis of the projection lens 39 is swept across the chart 31 and the projection lens 39 focuses images of the chart lines onto the photocell and causes those images to sweep across the photocell to generate in the photocell pulses of current proportional in number to the number of lines exposed by the mask 32. In a commercial embodiment of this structure the lines on the chart 30 are spaced roughly a thousand to the inch and an optical magnification of thirty to forty times is employed so that the width of the slit 46 may be in the order of twenty thousandths of an inch.

The output of the photocell 42 is preferably fed directly into an amplifier mounted at the photocell so as to match the impedance of the photocell to the transmission line 12 without loss of signal.

*Figure III*

Referring now to Figure III, signals from the photoelectric scanner 11 transmitted over the lead 12 enter the amplifier and shaper circuit through point 5 of its terminal strip and are transmitted through condenser 51 and resistor 52 to a grid 53 of a pentode amplifier tube V-1. The junction between the input condenser 51 and grid current limiting resistor 52 is tied to ground through a one megohm resistor 54. A plate resistor 55 for the tube V-1 is tied between the B+ lead 56, which enters the circuit through point 4 of the terminal strip, and the plate 57 of the amplifier tube V-1. A screen grid 58 of the amplifier tube V-1 is tied directly to the B+ lead 56 and its cathode 59 is tied to the junction point between voltage divider resistors 60 and 61 the latter acting as a cathode resistor. This combination with a B+ voltage of 160 volts provides approximately three volts bias for the grid cathode circuit of the amplifier V-1. The cathode resistor 61 is by-passed with a condenser 62.

The input signals on the lead 12 transmitted to the grid 53 of the amplifier tube V-1 are approximately sinusoidal in form and are from two to ten volts amplitude peak to peak so as to drive the amplifier tube V-1 to saturation under the larger signals and provide at least a sixty volt signal at the plate 57 for the minimum input signal through the supply lead 12.

Output signals from the amplifier tube V-1 which approach a square wave, as indicated by the fragmentary wave form diagram 63, are transmitted through a coupling condenser 64 to a "Schmidt" trigger circuit including a duotriode tube V-2 and associated circuit components. The trigger circuit serves to take the approximately square wave output of amplifier tube V-1 and convert it to a steep sided square wave suitable for differentiation to provide the pulse signals for the counters and multiplier circuits involved in the computer.

The trigger circuit comprising the tube V-2 is arranged with its cathodes 65 and 66 tied to the grounded lead 67 through a cathode resistor 68. Plates 69 and 70 are tied to the B+ lead 56 through resistors 71 and 72 the resistor 72 having about two-thirds the resistance of resistor 71. The input signals coupled through the coupling condenser 64 are applied through a grid current limiting resistor 73 to grid 74 of the first half of the tube V-2 that cooperates with the cathode 65 and plate 69. Grid bias for this grid is from the junction between a pair of one megohm resistors 75 and 76 connected in series between the B+ lead 56 and the ground lead 67. A grid 77 of the second half V-2b of the trigger circuit is tied to the plate 69 through a parallel combination of a resistor 78 and a condenser 79 and is tied to ground through resistor 80.

In the absence of an input signal the left half of the tube V-2 draws current since in the absence of grid current the bias supplied to the left half would be half the voltage on the B+ lead 56 or approximately 80 volts. The grid current flow through the grid 74, the left grid, reduces this voltage to approximately 30 volts, i.e., the voltage which is developed at the cathode 65 as a result of plate current flow through the plate resistor 71 and the cathode resistor 68. The right half of the tube is nonconducting since its grid 77 is biased negative with respect to cathode sufficiently to cut off the electron flow. Because of the grid current flow through the grid 74 the coupling condenser 64 is charged to the difference in voltage between the plate 57 and the junction between the resistors 75 and 76 so that the first negative going portion of the signal from the amplifier V–1 drives the grid 74 negative from its equilibrium potential thus reducing current flow through the left half of the tube V–2. The reduced current flow results in a positive going voltage at the plate 69 and a negative going voltage at the cathode 65. As the plate 69 goes positive it drives the grid 77 in a positive direction so that the right half of the tube starts to draw current. Such current flowing through the cathode resistor 68 raises the potential of the cathode 66 which decreases the current flow through the left half of the tube thus accelerating the current shift from the left to the right half of the tube. The action is regenerative and takes place very rapidly. On the second half of the signal when the grid voltage on the grid 74 is positive going the action reverses just as rapidly so that the tube in effect acts as a toggle in snapping from one condition of conduction to the other. The resulting voltage at the plates 69 and 70 is an extremely steep sided square wave having rise and fall times of less than a microsecond each and a duration in either of its stable states depending upon the duration of the input signal. The square wave output is indicated by the fragmentary wave form diagram 81 appearing just to the right of the resistor 72. The square wave signal appearing at the plate 70 as represented by the diagram 81 is transmitted through a lead 82 and terminal point 10 to the conductor 14 leading to the gross weight counter 15 and to the gating circuit 18.

A clamping circuit is provided to paralyze the trigger circuit whenever it is desired to interrupt the transmission pulses through the circuit. This may occur for example when it is desired to take a readout reading from the electronic counters without stopping the photoelectric scanning device 11. This clamping circuit comprises a first half of a third thermionic tube V–3 having a cathode 85 that is biased negatively with respect to the grounded lead 67 by a voltage divider comprising resistors 86 and 87 connected between grounded lead 67 and a negative bias lead 88. The bias lead 88, which is connected to terminal strip point 6, is normally held at a negative potential of 135 volts with respect to ground so that the combination of the two resistors 86 and 87 holds the cathode 85 approximately 50 volts negative with respect to ground. A control grid 89 of the tube V–3a is connected to terminal strip point 9 and is also connected through a 270,000 ohm resistor 90 to the bias lead 88 and is by-passed to ground by condenser 91 of approximately .0001 micro-farad. Normally the tube V–3a is nonconducting so as to have no effect on the trigger circuit. When it is desired to stop the signal the grid 89 may be grounded through a control circuit having low resistance so as to remove the negative bias from the grid 89 and permit the tube to conduct. This, in effect, grounds the grid 77 insofar as signals are concerned and paralyzes the trigger circuit comprising the tube V–2 to stop the transmission of pulses.

The plate 70 or output lead 82 is also connected through a resistor 92 and condenser 93 to a grid 94 of the second half of the tube V–3, that is, section V–3b whose cathode 95 is connected directly to the grounded lead 67 and whose plate 96 is connected through a resistor 97 to the B+ lead. The plate 96 is also connected to ground through a condenser 98. Bias for the grid 94 is provided by a voltage divider consisting of resistors 99 and 100 arranged to give a 13 to 14 volt negative bias which is just enough to keep the tube in a nonconducting state in the absence of signal. As long as the tube V–3b is nonconducting the condenser 98 tends to charge to the B+ potential. As soon as a positive signal is received from the trigger circuit the tube conducts on the positive pulses to discharge the condenser 98. The condenser 98 then slowly recharges by current flow through the resistor 97. As long as signals continue to arrive as in an ordinary scanning sequence during a single scan of the chart the condenser 98 is discharged by each pulse so as to maintain the potential of the plate 96 at a low value.

The tube V–3b and in particular the voltage on its plate 96 controls a second trigger circuit comprising a third duotriode tube V–4a and V–4b which serves to provide a sharp sided square wave that goes positive at the first positive signal received from the amplifier V–1 and remains in its positive output state until a short time after the sequence of pulses has been received. The second trigger circuit tube V–4 has its cathodes 101 and 102 tied to ground through a resistor 103 and has its plates 104 and 105 tied to the B+ lead 56 through resistors 106 and 107 respectively. Grid 108 of the left half or section V–4a is tied to plate 96 of the tube V–3b while grid 109 of the second section V–4b is tied to ground through a resistor 110 and is tied to the plate 104 through the parallel combination of a resistor 111 and a condenser 112. In the absence of input signals the left half V–4a is normally conducting since the rise in potential of the grid 108 as the condenser 98 charges is limited only by grid current flow through the cathode 101.

This second trigger circuit acts similarly to the first and triggers from one state to the other according to the potential on its grid 108. Thus in this circuit it triggers on the first pulse and shortly after the last pulse of each train of pulses to provide a square wave output having one cycle for each series of pulses. These square wave outputs are delivered on output leads 113 and 114 connected to the plates 104 and 105 and to terminal strip points 3 and 11. These output signals are used for auxiliary equipment where it is necessary to control such equipment according to the start and end of the scan or to count the number of scans.

The positive going signal on the plate 104, corresponding to the start of a series of pulses is coupled through a condenser 115 and grid current limiting resistor 116 to a grid 117 of a thyratron V–5. The thyratron V–5 has its cathode 119 connected to ground through a 150 ohm resistor 120, has its plate 121 connected to the B+ lead 56 through a resistor 122 and has its screen grid 123 connected to its cathode 119. The junction between the coupling condenser 115 and the grid current limiting resistor 116 is biased negatively by a voltage divider comprising a resistor 124 connected to ground and a resistor 125 connected to the bias lead 88. This maintains a negative bias on the grid 117 of approximately 20 volts negative with respect to ground. In the absence of input signals a condenser 126 connected between the plate 121 and the ground lead 67 charges through the resistor 122 to approximately the same potential as the B+ lead 56. The first incoming signal transmitted through a trigger stages and the coupling condenser 115 causes the thyratron to fire and discharge the condenser 126 through the resistor 120. Since the voltage drop through the thyratron, when carrying current, is approximately 15 volts this produces a sudden voltage rise at the cathode 119 which persists during the time required to discharge the condenser. This voltage pulse appearing across the resistor 120 and lasting for about 50 microseconds is used to reset the counters and other circuits at the start of each series of pulses that are to be counted. The voltage appearing at the cathode 119 is transmitted through a lead 127 to the reset lead 16 connected to the counters 15 and 20.

Heaters 128 for the various tubes are shown connected in parallel between heater leads H connected to points 1 and 7 of the terminal strip. Since these are conventional and are required for all electronic tube circuits they are shown in this diagram only and in the following diagrams it is to be understood that conventional heater circuits are employed for all of the thermionic tubes illustrated.

*Figure IV*

The gating circuit 18, as shown in Figure IV, accepts the counter pulses appearing on the output lead 82 of the trigger circuit shown in Figure III and transmitted through lead 17 to the gate circuit where it enters at terminal point 5 of the terminal strip and thence through lead 130 and differentiating coupling condensers 131 and 132 to grids 133 and 134 of gating tubes V–6 and V–8 respectively. The grids 133 and 134 are tied to voltage dividers by way of grid resistors 135 and 136. The voltage dividers for the tube V–6 comprise resistor 137 connected to plate 138 of a second section of a switching tube V–7 and through resistor 139 to a negative bias lead 140 which is connected through terminal point 2 of the terminal strip. This bias voltage is the same as that applied to point 6 of the terminal strip in Figure III and is approximately 135 volts negative. The function point between the voltage divider resistors 137 and 139 is connected through a small condenser 141 to ground so as to by-pass undesired transients without permitting them to affect the gating tubes V–6 and V–8. As long as the switching tube V–7b is not drawing plate current the potential between the junction point between the resistors 137 and 139 is positive with respect to ground so that tube V–6 may conduct current. This tube is connected as a cathode loaded amplifier having a cathode resistor 142 connected between its cathode 143 and the ground lead. The tube delivers signals by way of its cathode 143 to an output lead 144 that is connected through terminal point 9 of the terminal strip and lead 21, as shown in Figure I, to the multiplier circuit 22. This circuit is operative after the tare pulses have been accounted for and the scanner is delivering the remainder of its series of pulses corresponding to the net weight of the commodity on the scale. To minimize the voltage fluctuation due to switching at cathode 143 a second resistor 145 is connected between the B+ lead and cathode 143. This maintains sufficient positive voltage on the cathode 143 to reduce the required grid voltage change required to cut off current flow through the tube and thus act to gate the signals.

The switching tube V–7 comprising triode sections V–7a and V–7b is connected as a bi-stable flip-flop circuit in which cathodes 146 and 147 of the tube are connected together and are tied to ground through cathode resistor 148 and by-pass condenser 149. Plate 138 of the second triode section V–7b is tied to B+ lead through resistor 150 and is connected to grid 151 of triode section V–7a by way of resistor 152 and condenser 153 connected in parallel. The grid 151 is also tied to ground through a grid resistor 154. In a similar manner a plate 155 of the triode section V–7a is connected to the B+ line through plate resistor 156 and is tied to grid 157 of triode section V–7b by way of parallel combination of resistor 158 and condenser 159. The grid 157 is also tied to ground through a resistor 160. The various resistors are proportioned so that only one of the two triodes may conduct at any one time and so that a sharp negative voltage pulse applied to the grid of a conducting tube will cause the conduction to cease in the then conducting triode and conduction to start in the other triode.

The voltage at the plate 155 is employed to control the grid bias of the second gating tube V–8. To this end the plate 155 is connected through the parallel combination of resistor 161, condenser 162 to one end of the resistor 136 that is connected to the grid 134. The junction of the resistors 161 and 136 is also connected through a resistor 163 to the negative bias lead 140. The resistors are proportioned so that when the triode V–7a is drawing plate current through its plate resistor 156 the voltage at junction point 164 is sufficiently negative so that gating tube V–8 cannot conduct current and so that when plate 155 is not drawing current the voltage at the junction point 164 is positive enough to permit the gating tube V–8 to operate and pass current from its plate 165 to its grounded cathode 166. The plate 165 of the gating tube V–8 is connected to B+ through resistor 167 and condenser 168. The signal voltage appearing at plate 165 transmitted through output lead 169 to terminal point 3 of the terminal strip and thence through lead 19, as shown in Figure I, directly to the counter 20.

At the start of a scan the sharp negative going voltage appearing on the lead 113 of Figure III is applied through terminal 8 of Figure IV and condenser 170 to a parallel combination of a resistor 171 and crystal rectifier 172 connected to ground. The relative values of the condenser 170 and resistor 171 are such that the voltage appearing at the junction between them is a sharp negative going pulse lasting a very short time. This pulse of voltage is applied through condenser 173 to control grid 151 of the switching tube V–7 so as to momentarily cut off the flow of current through the first triode section V–7a. The crystal rectifier 172 is included to limit the positive going voltage applied to the grid 151 at the end of a scan when the voltage on the lead 113 again goes positive. As current flow is cut off in the first triode section V–7a and its plate 155 goes positive it applies sufficient voltage to the resistors 161 and 163 to permit the gating tube V–8 to conduct current and to transmit pulses receiving over lead 130 from the external lead 17 and amplify such pulses and deliver corresponding negative going pulses over output lead 169 to an intermediate decade of the counter 20. As soon as counter 20, which was preset to the nines complement of the tare weight to be subtracted, fills to capacity it transmits from its highest decade a stop signal over lead 26 and thence through terminal point 10 of the terminal strip, Figure IV, lead 174 and condenser 175 to grid 157 of the second triode V–7b of the switching tube V–7. The lead 174 is also tied to ground through resistor 176 and condenser 177 to serve as loading resistors for the line 26 and to by-pass undesired transients to ground. The negative pulse appearing on the lead 174 from the counter 20 as it is applied to the grid 157 cuts off current flow through the right hand section V–7b of the switching tube so that its plate 138 then goes positive to start current flow through the triode section V–7a and at the same time raise the potential of the grid 133 of the first switching tube so that the signals received over lead 17 are then amplified and appear on the output lead 144 which goes through the external connection 21 to the multiplier 22.

This gating circuit thus serves to route the pulses from the amplifier and shaper circuits either to the counter, as the tare weight is being counted, or through the multiplier when the net weight pulses are being transmitted.

*Figure V*

The multiplier pulse generator comprises five dual triode tubes V–9, V–10, V–11, V–12, and V–13. Each triode section of each of the tubes V–9 to V–13 inclusive is connected as a blocking oscillator. The circuit of each oscillator includes a grid resistor 180, a grid winding 181 of an oscillator transformer 182, and a grid 183 of a triode section which cooperates with a cathode 184 and a plate 185. The plate 185 is connected to the B+ lead through a plate winding 186 of the transformer 182 which winding 186 is shunted by a damping resistor 187. A voltage appearing at the plate 185 is transmitted through a small coupling condenser 188 to the junction point between the grid resistor and the grid winding of the transformer of the next oscillator circuit. The input signals received over the lead 21 are transmitted through terminal block point 5 of Figure V and thence through input condenser 189 to the junction between the grid resistor 180 and a grid winding 181.

Normally sufficient bias is maintained on a bias lead 190 to which the grid resistors 180 are connected so that the triode sections are all operated at current cut-off and none of them are drawing current. A positive pulse of voltage applied from the gating circuit through lead 21 drives the first oscillator grid 183 sufficiently positive so that current may flow from the B+ lead through the plate winding 186 and through the tube and its cathode resistor 191 to a grounded lead 192. This current flow through the plate winding 186 generates a voltage in the grid winding 181 in a direction to drive the grid 183 positive as long as current flow in the plate circuit is increasing. When the plate circuit saturates so that the current no longer can increase the grid voltage drops and the tube then starts to cut off current flow through its plate circuit resulting in a negative voltage being generated in the grid winding to further cut off the flow of current. Thus, as a result of a positive voltage pulse applied to the grid the tube executes one cycle of oscillation or passes one pulse of current.

While the pulse of current is being passed by the first triode section, its plate first goes negative and then returns positive. During the negative going portion, the output condenser 188, which is also the input condenser for the next section, couples the plate voltage change of the first section into the grid circuit of the second section. The relative magnitudes of the condenser 188 and the grid resistor for the next section are selected so that partial differentiation of the voltage pulse is obtained which results in a positive voltage being transmitted to the grid of the next section as the plate voltage of the first section goes positive at the end or trailing portion of the voltage pulse. This positive going voltage applied to the next grid circuit causes that tube to execute one cycle of oscillation and it in turn starts the next tube and so on down the line for all ten sections.

Output voltage pulses from the pulse generator are taken from the cathode circuits of the various stages in the generator. Thus, the cathodes of V-9 are returned to ground through resistor 191 so that two voltage pulses appear across the resistor 191, one as the first section executes its cycle of oscillation and one as the second section executes its cycle of oscillation. Similarly, the cathodes of V-10 and V-11 are tied to ground through cathode resistor 193. Since these four sections of the two tubes V-10 and V-11 are connected through this one resistor four voltage pulses appear across the resistor 193 for each input pulse applied over the lead 21. The two cathodes of V-12 are likewise connected to ground through a common resistor 194 while the cathodes of V-13 are separated, the first one being connected to ground through resistor 195 and the second one through resistor 196.

The pulse generator thus produces for each input pulse a series of ten output pulses that are spaced in time with the first two pulses appearing at cathode resistor 191, the next four pulses appearing at cathode resistor 193, the next two pulses appearing at cathode resistor 194, the ninth pulse appearing at cathode resistor 195 and the tenth pulse appearing at resistor 196.

The output voltages from the pulse generator cathode circuits are made available at a plurality of output leads 197, 198, and 199 connected to selector switches connected to the common terminals 200, 200a, and 200b of multiplier factor selector switches each of which has ten points or ten positions corresponding to the ten digit values in the decimal system. The stationary contacts of the selector switches are connected in parallel to nine leads 201 to 209 inclusive. The lead 201, connected to the one position point on each of the selector switches, is also connected directly through lead 210 to the cathode resistor 195 of the first section of V-13. Thus, this lead has one pulse for each input pulse applied to the pulse generator. The zero point of each of the selector switches has no connection since no pulses are required in the counter when the multiplier factor is a zero. A next lead 202 connected to the number two position of each of the selector switches is connected directly through lead 211 to the cathode resistor 194 of V-12 and thus transmits two pulses, namely the seventh and eighth pulses of the generator series, to this particular lead.

A number three lead 203 is connected through crystal diodes 212 and 213 to the leads 211 and 210, respectively, so that the number three position on each selector switch receives three pulses. Lead 204 connected to the fourth point of each of the selector switches is connected directly through lead 214 to the cathode resistor 193 serving tubes V-10 and V-11. This lead thus receives four pulses corresponding to the third to sixth inclusive of the train of pulses and transmits these directly to the fourth point of each selector switch. Continuing further, lead 205, connected to the number five position of each selector switch, is connected through crystal diodes 215 and 216 to the leads 214 and 210, respectively, so as to receive five pulses per generator cycle. In like manner, lead 206, connected to the sixth position of each selector switch, is connected through crystal rectifiers 217 and 218 to the leads 214 and 211, respectively, so as to add the pulses appearing across the cathode resistors 193 and 194 for a total of six pulses per cycle. A seventh lead 207 is connected through crystal rectifiers 219 and 220 so as to add the pulses appearing on leads 206 and 201 thus making seven pulses per cycle. Lead 208, connected to the number eight position of each switch, receives six pulses per cycle from lead 206 by way of crystal rectifier 221 and receives an additional two pulses through lead 222 connected to the cathode resistor 191 of V-9 through crystal rectifier 223. And finally, lead 209, connected to the number nine position of each switch, receives eight pulses from lead 208 through crystal rectifier 224 and one additional pulse per cycle through crystal rectifier 225 connected to lead 210.

Thus, in this circuit each contact of the selector switches receives a number of pulses for each input pulse applied to the pulse generator corresponding to its position in the series of contacts.

The trailing edges of the voltage pulses appearing across the cathode resistors 195 and 196 of V-13 are employed after differentiation to clear the storage tubes which store the carry counts in the counter during the multiplying operation. The voltages across these cathode resistors 195 and 196 appear at points 10 and 11 of the terminal strip of Figure V. The cathode resistor 195, of the first section of V-13, is connected through lead 226 of Figure I and serves to clear the first of the carry storage circuits 23 illustrated next to the counter 20. Likewise, the voltage appearing across the cathode resistor 196 of the second section of V-13 is transmitted through lead 227 to clear the second of the storage circuits 23. The counter 20 comprises a plurality of decades 20a, 20b, 20c, 20d, 20e, and 20f corresponding to the several orders of a multi-digit decimal number with the carry storage circuits 23 included between decades 20a and 20b and between 20b and 20c.

From the multiplier 22 the pulses delivered through the selector switches to leads 197, 198, and 199 are transmitted through amplifiers to their respective counter decades 20a, 20b and 20c. Associated with each of the amplifiers receiving pulses over leads 198 and 199 are the carry storage circuits which are responsive to input signals from the next lower counter decade and which transmit, in response to pulses received over leads 226 or 227, carry pulses to the next decades 20b or 20c, respectively.

The amplifier and storage circuits are illustrated in Figure VII. The positive going signals received over the multiplier output leads such as lead 197 are coupled through input condensers 228 and crystal rectifier 229 to grid 230 of amplifier tube V-14. Cathode 231 of V-14 is grounded, its screen grid 232 is tied directly to the B+ lead, its suppressor 233 is tied to its cathode 231 and its plate 234 is connected through plate resistor 235 to the B+ lead. The positive going signals received over the lead 197 after amplification appear as negative going signals on an output lead 236 for transmission directly to the associated counter decade. To limit the amplitude of the pulses transmitted on the lead 236 a crystal rectifier 237 is connected between the plate 234 and a junction 238 between resistors 239 and 240 forming a voltage divider between the B+ lead and ground. The rectifier 237 is arranged so that as long as the plate 234 is positive with respect to the junction 238 no current can flow through the rectifier while if the plate tends to go negative with respect to the potential of such junction, current flows from the junction through the rectifier 237 to thus limit the change in plate voltage. To minimize the variations in potential of the junction 238 a condenser 241 is connected in parallel with the resistor 240. Grid bias for the grid 230 of the amplifier V-14 is provided by voltage divider resistors 242 and 243 connected between the ground lead and a negative voltage supply represented by terminal 244. The voltage at the junction between the resistors 242 and 243 is transmitted through a grid resistor 245 to the grid 230 of the amplifier V-14.

The input circuit for the amplifier also includes resistor 246 serving as a terminating resistor for the line 197 from the multiplier and a resistor 247 and parallel crystal rectifier 248 serve to differentiate the voltage pulses appearing on the lead 197 and also limit the tendency of the grid 230 to bias itself by grid current flow in the presence of large signals. Thus, as the signals tend to increase to the point where the grid draws current such current may be supplied through the diode 229 without a significant drop in average potential.

In addition to transmitting the pulses from the multiplier to the associated counter decade the amplifier also receives the carry pulses by way of condenser 249 connecting the grid 230 to the output of the carry storage circuit.

The storage circuit for storing the carry pulses to prevent interference between pulses fed from one decade to the next and pulses fed directly from the multiplier comprises a bi-stable flip-flop circuit including dual triode tube V-15 arranged as a conventional flip-flop circuit. In this circuit cathodes 250 and 251 are tied to ground through cathode resistor 252 and by-pass condenser 253. Plates 254 and 255 are connected to the B+ lead through resistors 256 and 257 respectively. The plate 255 is also connected through resistor 258 to grid 259 cooperating with the cathode 250 and the grid 259 is also connected to ground through grid lead resistor 260. The plate to grid resistor 258 is by-passed by a small condenser 261. In a similar manner plate 254 of the first section of the tube V-15 is connected through a plate to grid resistor 262 to grid 263 of the second section of the tube and the grid 263 is connected to the reset circuit through grid resistor 264. Condenser 265 is provided in parallel with the resistor 262.

The various resistors in this circuit are proportioned so that the tube is bi-stable, i.e., only one section can conduct at any one time and the state of conduction may be transferred by a voltage pulse from one section to the other. For resetting purposes the grid to counter resistor 264 is connected to the reset lead 16 of Figure I which, as shown in Figure III, is connected to ground through a 150 ohm resistor 120 in the cathode circuit of of the thyratron V-5. Thus, when the thyratron fires at the start of a scan, the positive voltage pulse applied to the reset lead 16 drives the grid 263 positive so that the right half of V-15 becomes conducting and the left half non-conducting. At the end of each cycle of operation of the pulse generator, i.e. as the tube V-13 operates in response to the pulses transmitted through the chain of oscillators for each input pulse, a positive going pulse of voltage across the cathode resistor 195 of V-13 is applied through lead 270 and condenser 271. Since this pulse of voltage first goes positive, current flows through the condenser 271 and crystal rectifier 272 to grounded lead. The rectifier is by-passed with a resistor 273. The low impedance of the rectifier limits the positive voltage appearing at the junction between the condenser 271 and resistor 273. The negative going portion of the voltage pulse, the trailing edge of the pulse, because of the charge stored in the condenser 271 transmits current through condenser 274 to a grid 259 of the first section of V-15 to drive that grid negative and thus cut off the flow of current through the left side of the tube in case it is conducting. This side is conducting only if a carry pulse has been received from the next lower counter decade since the next preceding pulse from the oscillator V-13 of the pulse generator.

The carry pulses from the next lower counter decade that is one pulse for each count of 10 are received through a lead 275 and transmitted through condensers 276 and 277 to the grid 263 of the second section of the tube V-15. The junction between the condensers is grounded through resistor 278 to provide differentiation of the voltage pulse. A negative going pulse is received from the next lower counter decade each time it reaches a count of 10 drives the grid 263 negative and thus cuts off the flow of current which had been established by the reset pulse or next preceding carry clear pulse from the oscillator V-13. With the current in the right side of V-15 cut off the plate 255 is driven positive and plate 254 is driven negative by current flow through the left half of V-15. The resulting negative going voltage appearing or transmitted through condenser 249 would drive the grid 230 negative except for the low impedance to ground offered by the series arrangement of the crystal rectifiers 229 and 248. Thus this negative going voltage signal has no appreciable effect on the amplifier V-14. The impedance of this circuit is high enough so that a pulse simultaneously received over lead 197 from the pulse generator may overcome it and drive the grid 230 in the positive direction to amplify the pulse in the normal manner.

When the grid 259 is driven negative by the carry clear signal transmitted over lead 270, which is connected to the lead 226 or 227 from the multiplier, the resulting positive going voltage appearing at plate 254 as the tube is reset is differentiated by condenser 249 and resistor 245 to provide a pulse at the input of the amplifier V-14 and thus introduces the carry signal into the next decade at a time when it cannot interfere with the pulses received directly from the multiplier.

*Figure VI*

A typical counter decade is illustrated in Figure VI together with circuits arranged so that the counter decade may be preset to any given number. Each counter decade, as illustrated in Figure VI, comprises four dual triodes V-16, V-17, V-18 and V-19 connected as bistable flip-flop circuits. Since the individual stage circuits are identical except for certain feedback circuits to enable the four stages to count by a counting index or radix of ten instead of sixteen the detail circuit will be described in connection with one stage only. The essential parts of the circuit for one stage include cathodes 279 and 280 which are tied together and connected to ground through the parallel combination of cathode resistor 281 and by-pass condenser 282. The plate circuit of the stage includes a common plate resistor 283 and individual plate resistors 284 and 285 connected to plates 286 and 287 respectively. The plate 286 is connected through coupling resistor 288 and coupling condenser 289 to grid 290 cooperating with cathode 280. The grid 290 is connected to ground through grid return resistor 291 and contacts of a relay resetting arrangement which permits selective presetting of the stage. Likewise, plate 287 is connected through coupling resistor 292 and parallel condenser 293 to grid 294 cooperating with the cathode 279. The grid 294 is connected to ground through grid return resistor 295 to the contacts of the presetting relays. The counter stage responds to negative going input signals received over lead 296 transmitted through condenser 293 coupling the lead 296 to the junction between the common and individual plate resistors 283, 284, and 285. Likewise the output signal of the stage is taken from the plate 287 through a condenser 297a of the next stage.

For indicating purposes the plates 286 and 287 are connected to output resistors 299 and 300 to which indicating or readout equipment may be connected without disturbing the operation of the circuit.

The resistors involved in this circuit are proportioned so that the amplifier V-16 is bistable and input pulses, by driving the junction between the common plate resistor and the individual plate resistors negative, cause a transfer of conduction to occur between the sections each time a negative going pulse is received. Each stage thus serves to divide the count by two. Each time the plate 287 of the first stage V-16 goes negative it supplies a similar negative pulse to the next stage and it in turn to the next and so on so that V-16 counts by twos while V-17 counts by fours, V-18 by eights and V-19 by sixteens. Since it is desirable to count by tens instead of by sixteens a feedback circuit is taken from the right hand section of V-18 through condenser 301 and resistor 302 to the left hand grid of V-17 to add two extra counts. Likewise a similar circuit is taken from the right plate of V-19 through condenser 303 to resistor 304 to the left grid of V-18 to add four extra counts.

In tracing the operation of the counter each of the tubes V-16 to V-19 will be considered as being "on" when its left section is conducting current and its right section is cut off. Starting with a zero indication, all tubes "off," the first pulse received over lead 296 from the associated amplifier V-14 of Fig. VII because of the then existing potential distribution momentarily drives the grid 290 of the right section, the conducting section, negative to cut off current flow in that section. The resulting rise in voltage at plate 287 in the right section is coupled to the left grid 294 to establish current conduction in the left section. This turns the tube "on" thus registering one count.

The next pulse received over lead 296 from the amplifier reverses the state of conduction and leaves the tube V-16 in its "off" condition. As the current flow is established in the right section the plate 287 drops in potential and thus transmits a negative going signal through condenser 297a into the next stage including tube V-17 to turn this tube "on" to register two counts. The third pulse turns V-16 "on" without affecting tube V-17.

The fourth pulse from the amplifier turns V-16 off and it, in turn, turns the second tube V-17 off which turns V-18 on. When the right plate of V-18 goes positive as conduction switches to the left section a positive voltage pulse is transmitted through condenser 301 and resistor 302 to the left (now nonconducting) grid of V-17 thus returning V-17 to its "on" condition. Thus a count of four is indicated by the "on" condition of V-17 and V-18.

The fifth pulse returns V-16 to its "on" condition, thus leaving V-16, V-17, and V-18 in their "on" conditions to indicate a count of five.

The sixth pulse turns V-16 "off" which results in V-17 and V-18 being turned "off" in turn. As V-18 is turned "off" it triggers V-19 to its "on" condition. As the right section of V-19 stops conducting current a positive voltage is fed back through condenser 303 and resistor 304 to the left grid of V-18 thus tripping V-18 to its "on" condition. The time constant of the feedback path through resistor 304 and condenser 303 is from two to three times greater than the time constant of condenser 301 and resistor 302 and the latter is long enough with respect to the recovery time of V-18 so that no appreciable positive voltage pulse is transmitted to the left grid of V-17 as a result of the negative pulse of voltage appearing momentarily at the right plate of V-18. Thus the resetting of V-18 to its "on" condition does not result in a resetting of V-17 so that after six pulses V-18 and V-19 are "on" and V-16 and V-17 are "off."

The next three pulses cycle the first two tubes V-16 and V-17 in the same manner as the first three pulses to register counts of seven, eight, and nine. The tenth pulse, since after the ninth pulse all stages were "on," turns all tubes "off" or in effect resets to zero. The count registered may be readily interpreted by assigning a value of "one" to V-16, a value of "two" to V-17 and to V-18, and a value of "four" to V-19 and adding the values of the "on" tubes.

The right plate of V-19 is connected through output lead 305 to supply a negative pulse either directly to the next decade when no carry storage stage is needed or to the storage tube V-15 when storage is needed each time V-19 is turned "off" indicating the accumulation of ten counts. Thus the next decade counts by tens and the next by hundreds, etc.

In an ordinary counter that is always reset to zero the left section grid resistors 295 are grounded for all stages and the right grid resistors 291 for all stages are grounded through a low resistance. A positive voltage momentarily applied across the low resistance drives all the right grids positive long enough to establish current flow in each right section. If the grid resistor connections are reversed the counter decades reset to nine instead of zero.

The gross weight counter 15 comprises a plurality of counter decades, as just described, that are always reset to nine. Thus upon the receipt of the preliminary signal pulse from the scanner following the initial or reset pulse they add one count thus presenting a zero indication. The carry beyond the capacity of the counter is discarded.

The counter 20 comprises a plurality of counter decades 20a to 20f inclusive. The low order decades 20a, 20b, and 20c are fed pulses from the multiplier 22 through the amplifier and carry storage circuits shown in Fig. VII. These decades are reset in the ordinary manner by a positive voltage pulse transmitted over lead 16.

The higher order decades 20d, 20e, and 20f are used for two purposes. First, they are preset to the nines complement of the tare weight by means of the tare preset circuits 24, and second, after counting out the tare pulses, they count the pulses received from the lower order decade 20c, representing the corrected or modified net weight. The presetting circuit for one decade is shown in Fig. VI. This portion of the circuit comprises four relays R–1, R–2, R–3, and R–4 associated with the tubes V–16, V–17, V–18 and V–19 respectively.

Each of the relays R–1 to R–4 has a double-pole double-throw set of contacts including fixed contacts 306 and 307 connected through lead 308 to ground and fixed contacts 309 and 310 connected to the reset lead 16. Movable contact 311 cooperating with contacts 306 and 309 is connected to the left grid resistor 295 of the associated tube while a movable contact 312 cooperating with contacts 307 and 310 is connected to the right grid resistor 291 of the associated tube. When the relay is deenergized the left grid is connected through contacts 311—309 to the reset lead 16 while the right grid is connected through contacts 312—307 and lead 309 to ground. When the relay is energized the connections are reversed. Therefore, when the relay is deenergized the tube resets to its "on" condition and when the relay is energized the tube resets to its "off" condition.

In order that the counter decades 20d—20f may be used to count the tare pulses received over line 19 and deliver a pulse over line 26 as the tare count is reached the counter decades 20d—20f are reset to the nines complement of the tare count. The last decade 20f then delivers a signal on its output lead 305 when it resets to zero after the tare count is completed during the counting operation to switch the gating circuit and reroute the amplified scanner pulses through the multiplier.

Each of the last three decades 20d—20f is provided with at least one selector switch 313 for each tare value to be electrically selected. The electrical selection is made by applying a positive voltage to a lead 314 that is connected through a crystal rectifier 315, to isolate the several selector switches for each decade as may be provided for selectively entering different preset tare values, to a movable contact 316 of the selector switch 313. The selector switch has ten positions corresponding to the ten digit values of the decimal system. In the zero position the switch 313 is open circuit and all the relays R-1 to R-4 are deenergized and the counter decade resets to nine (the nines complement of 0).

In the remaining nine positions various combinations of the relays R-1 to R-4 are energized by current flow from the movable contact 316 of the switch through the selected stationary contact and then either directly or through isolating rectifiers 317 to the selected relays. The selection is made according to the following table:

| Number | Nines Complement | Relays Energized |
| --- | --- | --- |
| 0 | 9 | 0. |
| 1 | 8 | R-1. |
| 2 | 7 | R-2. |
| 3 | 6 | R-1, R-2. |
| 4 | 5 | R-4. |
| 5 | 4 | R-1, R-4. |
| 6 | 3 | R-3, R-4. |
| 7 | 2 | R-1, R-3, R-4. |
| 8 | 1 | R-2, R-3, R-4. |
| 9 | 0 | R-1, R-2, R-3, R-4. |

Since the nines complement is used on each of the decades it is necessary to provide one extra pulse ahead of the actual tare count and thus, in effect, set the lower decade 20d to the tens complement of the lowest digit in the tare weight. This extra count is sometimes referred to as the "fugitive one" in computer parlance.

This system of counters, pulse generators and scanning units coupled with a weighing scale provides a system for first subtracting known tare weights from a series of pulses proportional in number to the gross weight on the scale and then modifying the net weight count according to the multiplication factor and accumulating the modified net weight count. By providing a number of tare weight selector switches connected in parallel to the resetting relays any of a number of preset tare factors may be electrically selected and introduced into the counter. An important economy of apparatus is achieved by using the same counter decades twice in each cycle of operation, first to count the tare weight pulses and trigger the gate circuit when the tare pulses are all received, and then to cooperate with lower order decades in counting the modified or multiplied net weight pulses. Thus the one counter serves the two purposes without any loss of accuracy or speed of operation.

Various modifications may be made in the various circuits without losing the advantage of a circuit for subtracting known tare weight and computing a corrected net weight according to the actual net weight and an arbitrary correction factor.

We claim:

1. In a system of the class described, in combination, a source of electrical pulses providing a series of pulses equal in number of the sum of a known number and an unknown number, a counter, means for presetting the counter to the complement of the known number, a multiplier for producing a selected number of pulses for each received pulse, means connecting the multiplier to the counter, and a gating circuit, said gating circuit being connected to direct pulses from said source to said counter until said counter reaches capacity and then to direct pulses to siad multiplier, whereby the final count in said counter corresponds to the unknown number of pulses as multiplied by the multiplier.

2. In a weighing and computing system, in combination, a weighing scale having means for generating a series of electrical pulses proportional in number to the load on the scale, an electrical counter, a gating circuit arranged in a first condition to connect the counter to said pulse generating means, means for presetting the counter to the complement of the tare weight on the scale, a multiplier circuit that generates a selected number of pulses for each received pulse, said gate circuit being arranged in a second condition to connect the multiplier to the pulse generator, said multiplier being operatively connected to supply pulses to the counter, and means for switching the gate circuit from its first condition to its second condition in response to said counter reaching its count capacity.

3. In a weighing and computing system, in combination, a weighing scale having means for generating a series of electrical impulses proportional in number to the gross load on the scale, an electrical counter for counting the pulses, a pulse multiplier for generating a selectable number of pulses for each input pulse, a gating circuit connecting the pulse generating means selectively to said counter and said pulse mutiplier, said pulse multiplier being arranged to feed its output pulses into said counter, means for presetting the counter to the complement of the tare load on the scale and the gate circuit to its condition to route pulses direct to said counter, and circuit means responsive to said counter reaching capacity count for setting said gate circuit to route pulses to said pulse multiplier.

4. In a weighing and computing system, in combination, a weighing scale having means for generating a series of electrical impulses proportional in number to the gross load on the scale plus one pulse, an electronic counter, a gating circuit, a multiplier that delivers a selectable number of pulses to said counter for each input pulse, means for presetting the counter to the nines complement of the tare load on the scale and for conditioning the gate circuit to transmit pulses from said scale generating means to said counter, and means responsive to said counter reaching capacity for conditioning the gate circuit to transmit pulses to said multiplier.

5. In a weighing and computing system, in combination, a weighing scale having means for generating a series of electrical pulses proportional in number to the gross load on the scale plus one pulse, an electronic counter, a multiplier circuit for generating a selectable number of pulses for each input pulse, means coupling said multiplier circuit to said counter, a gating circuit for connecting the pulse generating means to the counter when in its first condition and to said multiplier circuit when in its second condition, means for presetting the counter to the nines complement of a number representing the tare load on the scale and the gating circuit to its first condition at the start of a series of pulses from the scale, and means for setting the gate circuit to its second condition when said counter counts past its counting capacity.

6. A weighing and computing system according to claim 5 in which the presetting means comprises a series of relays for each decade that are combinationally energized according to the respective digits of the number representing the tare load.

References Cited in the file of this patent

UNITED STATES PATENTS

| 2,710,934 | Senn | June 14, 1955 |
| 2,803,448 | Biebel | Aug. 20, 1957 |